US010331943B2

(12) United States Patent
Kayhani et al.

(10) Patent No.: US 10,331,943 B2
(45) Date of Patent: Jun. 25, 2019

(54) AUTOMATED SCENARIO RECOGNITION AND REPORTING USING NEURAL NETWORKS

(71) Applicant: Cubic Corporation, San Diego, CA (US)

(72) Inventors: Niosha Kayhani, Sutton (GB); Steffen Reymann, Guildford (GB)

(73) Assignee: Cubic Corporation, San Diego, CA (US)

(*) Notice: Subject to any disclaimer, the term of this patent is extended or adjusted under 35 U.S.C. 154(b) by 0 days.

(21) Appl. No.: 16/050,892

(22) Filed: Jul. 31, 2018

(65) Prior Publication Data

US 2019/0034711 A1    Jan. 31, 2019

Related U.S. Application Data

(60) Provisional application No. 62/539,232, filed on Jul. 31, 2017.

(51) Int. Cl.
| G06K 9/00 | (2006.01) |
| G06K 9/62 | (2006.01) |
| G06N 3/04 | (2006.01) |
| H04N 7/18 | (2006.01) |
| G08B 21/02 | (2006.01) |
| G08B 25/00 | (2006.01) |

(52) U.S. Cl.
CPC ..... *G06K 9/00335* (2013.01); *G06K 9/00771* (2013.01); *G06K 9/6274* (2013.01); *G06N 3/04* (2013.01); *G08B 21/02* (2013.01); *G08B 25/006* (2013.01); *H04N 7/181* (2013.01)

(58) Field of Classification Search
None
See application file for complete search history.

(56) References Cited

U.S. PATENT DOCUMENTS

| 6,825,769 | B2* | 11/2004 | Colmenarez | ....... G06K 9/00771 340/3.1 |
| 2004/0141636 | A1* | 7/2004 | Liang | ........ A61B 5/1113 382/110 |
| 2009/0033745 | A1* | 2/2009 | Yeredor | ............. G01S 3/7864 348/152 |

(Continued)

OTHER PUBLICATIONS

International Search Report and Written Opinion dated Nov. 12, 2018 for International Patent Application No. PCT/US2018/044594 filed Jul. 31, 2018, all pages.

*Primary Examiner* — Bernard Krasnic
(74) *Attorney, Agent, or Firm* — Kilpatrick Townsend & Stockton LLP (57) ABSTRACT

An incident avoidance system includes a plurality of imaging sensors and a neural computing system. The neural network computing system is configured to receive an image feed from at least one of the plurality of imaging sensors and analyze the image feed to identify a pattern of behavior exhibited by subjects within the image feed. The neural computing system is further configured to determine whether the identified pattern of behavior matches a known type of behavior and send a command to one or more remote devices. One or both of a type of the command or the one or more remove devices are selected based on a result of the determination whether the identified pattern of behavior matches a known type of behavior.

10 Claims, 4 Drawing Sheets

(56) References Cited

U.S. PATENT DOCUMENTS

2010/0061624 A1    3/2010   Cobb et al.
2011/0050896 A1    3/2011   Cobb et al.
2016/0321891 A1*  11/2016   Zheng ................. H04L 12/2825
2017/0099200 A1*   4/2017   Ellenbogen ............. H04L 43/04

* cited by examiner

AUTOMATED SCENARIO RECOGNITION AND REPORTING USING NEURAL NETWORKS

CROSS-REFERENCES TO RELATED APPLICATIONS

This application claims the benefit of U.S. Provisional Application No. 62/539,232, entitled "AUTOMATED SCENARIO RECOGNITION AND REPORTING USING NEURAL NETWORKS", filed on Jul. 31, 2017, the entire contents of which are hereby incorporated by reference.

BACKGROUND OF THE INVENTION

Crowded areas, such as transit systems, malls, event centers, and the like often have security staff monitoring video systems to ensure that security and/or emergency situations are promptly detected and dealt with. However, in many cases, the crowded areas are too crowded or so large that it is difficult or impossible to monitor all of the necessary video feeds for a particular space without using an inordinately large staff of security personnel. Additionally, the human element involved in recognizing particular behaviors can result in delays in recognizing and responding to such behavior. Improvements in such security and emergency scenario recognition are desired.

BRIEF SUMMARY OF THE INVENTION

Embodiments of the present invention are directed to neural networks that can be trained to detect various scenarios that are present within video feeds, allowing the networks to simultaneously monitor large numbers of video feeds and instantaneously recognize known scenarios. This enables real-time notifications of such events to the necessary personnel. The neural networks described herein may be continually taught to recognize new patterns of behavior, as well as to receive additional sensor data which may be used to determine a cause of a particular scenario. This allows the neural network to identify a preventative action to ensure that a particular scenario does not happen or will be less likely to happen in the future.

In one embodiment, an incident avoidance system is provided. The system may include a plurality of imaging sensors and a neural computing system. The neural computing system may be configured to at a first time, analyze a plurality of image feeds and receive information related to a plurality of patterns of behavior. Each of the plurality of patterns of behavior may be associated with at least one of the plurality of image feeds. The information may include a characterization of at least one pattern of behavior present in each of the plurality of image feeds. The system may also be configured to store each of the plurality of patterns of behavior. The system may be further configure to at a second time, receive an image feed from at least one of the plurality of imaging sensors, analyze the image feed to identify a pattern of behavior exhibited by subjects within the image feed, and determine whether the identified pattern of behavior matches one of the stored plurality of patterns of behavior. The system may also be configured to send a command to one or more remote devices. One or both of a type of the command or the one or more remove devices may be selected based on a result of the determination whether the identified pattern of behavior matches one of the stored plurality of patterns of behavior.

In another embodiment, an incident avoidance system includes a plurality of imaging sensors and a neural computing system. The system may be configured to receive an image feed from at least one of the plurality of imaging sensors and analyze the image feed to identify a pattern of behavior exhibited by subjects within the image feed. The system may also be configured to determine whether the identified pattern of behavior matches a known pattern of behavior and send a command to one or more remote devices. One or both of a type of the command or the one or more remove devices may be selected based on a result of the determination whether the identified pattern of behavior matches a known pattern of behavior.

In another embodiment, a method detecting and avoiding incidents is provided. The method may include receiving, at a neural computing system, an image feed from at least one imaging sensor and analyzing the image feed to identify a pattern of behavior exhibited by subjects within the image feed. The method may also include determining whether the identified pattern of behavior matches a known pattern of behavior and sending a command to one or more remote devices. One or both of a type of the command or the one or more remove devices may be selected based on a result of the determination whether the identified pattern of behavior matches a known pattern of behavior.

BRIEF DESCRIPTION OF THE DRAWINGS

A further understanding of the nature and advantages of various embodiments may be realized by reference to the following figures.

DETAILED DESCRIPTION OF THE INVENTION

The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

Embodiments of the invention(s) described herein are generally related to automated scenario recognition and reporting using neural networks, which may be utilized in transit systems and similar applications. That said, a person of ordinary skill in the art will recognize that alternative embodiments may be utilized in other application, and that alternative embodiments may utilize alternative methods, functions, and/or components than the embodiments described herein. For example, similar scenario recognition and reporting using neural networks could be utilized in virtually any scenario in which an area is equipped with video camera technology, which may be linked through an internet protocol.

The techniques described herein are directed toward teaching a machine learning system to recognize situations involving human behaviors (or other subjects seen in image feeds such as devices, vehicles, animals, etc.) through deep learning, and feeding this into a real-time system accessible by operators (e.g., transit operators). The system will "learn" through neural networks by "watching" hours of video footages and receiving manual input to tell the machine what that particular video footage was, which can be from real or simulated situations, or both.

Depending on desired functionality, this system can be used for emergency, security, or even optimization procedures. By using historic footage or simulated scenarios, the system may be used to notify the stakeholders when a particular scenario has emerged again. An example would be if a person is being chased, the system may be taught by the neural network reviewing footage of the scenario happening and constantly teach it, so that if the neural network sees a similar situation, it knows to notify the stakeholder.

According to some embodiments, simulated scenarios may be created and fed in as a data source to closed circuit television (CCTV) cameras. Scenarios recognized or scenarios not recognized can be automatically reported through a browser, which makes it accessible anywhere and by anyone (with the right credentials).

The systems and methods described herein utilize neural networks to anticipate and react to human behavior and scenarios, linked with other technologies, such as facial recognition. These systems allow for faster reaction times to recognized scenarios and allow the neural network to act as an intermediary to human reactions and judgment, especially in emergency situations. The neural network systems described herein do not require constant monitoring by humans. Rather, the systems can rely on the machine to update in real-time and to report scenarios which they have been taught to recognize. These systems can recognize out-of-the-norm activities and/or "teach" the system to recognize certain behaviors (crowd flows, etc.). Embodiments of the invention(s) couple the neural networks with other data sources that allow the neural network(s) to identify causes of particular scenarios and/or preventative actions. Embodiments also enable the automated reporting of recognized behaviors to various devices where people on the move can receive signals directly, rather than requiring a human to report the information. This allows information to be transferred from the neural networks through an application programming interface (API) that can be accessed by various parties (which may be geographically dispersed) in real-time.

Embodiments of the present inventions provide one or more of the following advantages. Teaching the neural network(s) is similar to training a human to have witnessed all of the proposed scenarios. However, in contrast to the human, the neural network can be alert 24/7, simultaneously watch multiple cameras to look for similar scenarios it has been taught to look out for, respond instantaneously, and constantly learn new scenarios without forgetting anything. Embodiments also allow authorities, businesses, and operators to be alerted in real-time for various scenarios that they are interested in looking for. The judgement could replace the human element or may be used as a filtration process, which starts with the machine alerting a human for a scenario it has been taught to associate with something. Embodiments prepare and report for emergency and security scenarios can be more sophisticated and work alongside current infrastructure that supports facial and object recognition to further enhance authorities for security and/or emergency related situations. Embodiments allow for real-time alerts to be configured to ensure various people receive the notifications in real-time. This is particularly useful in emergency and/or security situations when normally a human reports the situation manually. The proposed systems can feed a larger set of parties to be notified.

Figure 1:
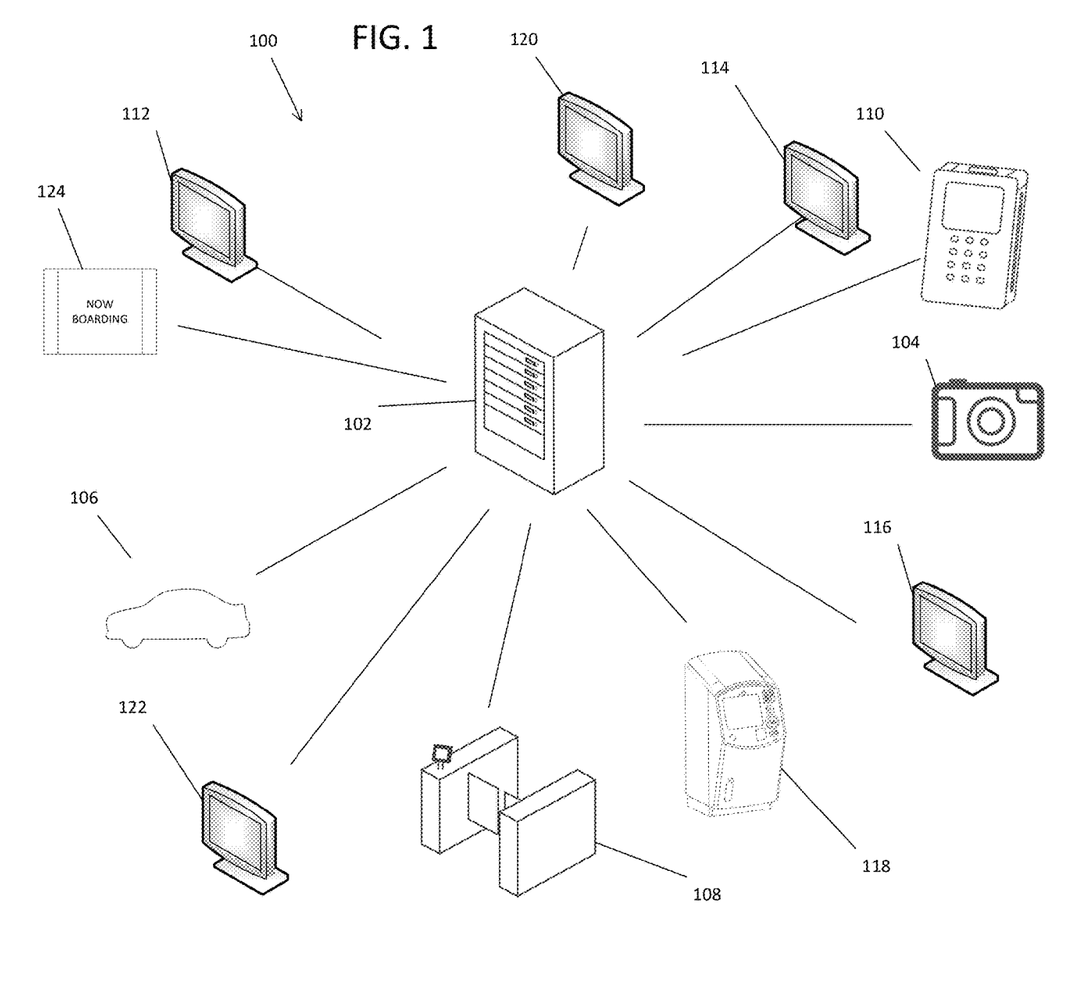
FIG. 1 depicts an incidence avoidance system according to embodiments.

Turning now to FIG. 1, one embodiment of an incident avoidance system 100. The system 100 may include one or more neural computing systems 102. Each neural computing system 102 may include one or more specially programmed processing devices (such as specially programmed central processing units (CPU), graphical processing units (GPU), and the like) that operate a network of simple elements called artificial neurons, which receive inputs, change their internal state (activation) according to each input, and produce an output depending on the input(s) and activation. The network forms by connecting the output of certain neurons to the input of other neurons forming a directed, weighted graph. For example, a neural network may consist of one or more neurons connected into one or more layers. For most networks, a layer contains neurons that are not connected to one another in any fashion. Rather, these neurons are connected to at least one layer of hidden nodes, some of which may be connected to a layer of output nodes. While the interconnect pattern between layers of the network (its "topology") may be regular, the weights associated with the various inter-neuron links may vary drastically. The weights as well as the functions that compute the activation can be modified by a process called learning, which is governed by a learning rule. The learning rule is a rule or an algorithm which modifies the parameters of the neural network, in order for a given input to the network to produce a favored output. This learning process typically amounts to modifying the weights and thresholds of the variables within the network.

In the present embodiments, supervised learning is typically used by the neural computing system 102 to enable its pattern recognition behavior, although it will be appreciated that in some embodiments other machine learning techniques may be utilized. In supervised learning, examples are fed into the neural computing system 102 and the neural computing system 102 attempts to model the examples with a function to generate a mapping implied by the example data. For example, in the present embodiment, a number of video or other image feeds may be provided to the neural computing system 102, which analyzes each of the video feeds. Manual input may be provided for each image feed that informs the neural computing system 102 as to what is happening in the image feed. For example, the image feed may show an instance of fare evasion (such as gate jumping, tailgating, or the like), an emergency situation (such as someone having a heart attack or other injury, a person being injured by transit system equipment or a vehicle, a female passenger going into labor, and/or any other situation in which one or more persons may be in some sort of danger), a problem with transit system equipment (gate or door being stuck, a ticket kiosk malfunctioning/being operational, etc.), excessive queueing, security concerns (fights, theft, vandalism, etc.), and/or other events. In some embodiments, multiple of these behaviors may be present in a single image feed. As each image feed is analyzed, the neural computing system 102 may retrieve manually inputted data tags associated with each feed. For example, if a particular image feed contains an image of a user who is tailgating at a gate, the data tag may instruct the neural network that the image feed is representative of such behavior. By watching numerous (tens, hundreds, thousands, etc.) image feeds of each behavior, the neural computing system 102 is able to detect patterns in the movement and interactions of people, devices, animals, and/or other subjects that are present in the image feeds for each pattern of behavior. In this manner, the neural computing system 102 may then be supplied with a real-time image feed(s), detect patterns of movement and other behavior within the image feed(s), and identify a particular pattern of behavior based on the similarities between the live image feed(s) and previously analyzed image feeds tagged with the particular pattern of behavior. Additionally, data associated with the new image feed, once identified, may be stored as an additional example of the particular pattern of behavior that the neural computing system 102 may use as learning material that may be used to help increase the accuracy of behavior detection of the neural computing system 102.

The image feeds (both those used in the learning process and the live image feeds) may be captured using one or more image sensors 104. Image sensors 104 may be cameras, such as CCTV cameras, infrared (IR) sensors, LIDAR sensors, and/or any other sensors that are able to track positions and movements of subjects within an image feed. In some embodiments, a combination of different types of image sensors 104 may be used.

The image feeds utilized in the learning process may be historical feeds, simulation feeds, and/or combinations thereof. For example, the historical feeds may be previously captured image feeds taken from image sensors at the same location and/or a similar location. A human analyst may review the historical image feeds and provide each image feed with a tag identifying a pattern of behavior represented by the particular image feed. The historical feeds may thus represent actual prior instances of the tagged behavior. In contrast, the simulation feeds may be staged scenarios that are exemplary of particular patterns of behavior. For example, an operator of the neural computing system 102 may have people, animals, and/or other objects act out a particular scenario for capture by the image sensors 104. Just as with the historical feeds, a human analyst may tag the simulation feed with a pattern of behavior represented by the particular feed.

In some embodiments, the data tag for any of the image feeds utilized in the learning process may include or be associated with additional data. For example, the additional information may include instructions to perform a particular action based on detecting a particular pattern of behavior. The instructions may include a command for a particular transit system device(s) and/or vehicle(s) 106 (trains, buses, cars, autonomous vehicles, etc.) to perform an action, such as open a gate 108 or door, change a message on signage, activate and/or deactivate one or more devices and/or vehicles. The instructions may also (or alternatively) include instructions to send a message to one or more user devices 110, devices of a transit authority 112 and/or other entity operating the monitored area, emergency devices 114, and/or other remote devices.

For example, when a pattern of behavior is detected that is related to a security concern, an issue with fare evasion, a problem with the transit system equipment, and/or other scenario, the instructions may force the neural computing system 102 to issue a notification to the transit authority 112 or other entity. This may involve sending the notification to a fare inspector device, a central security office computer, and/or other device of the transit authority 112 or other entity. The notification may include a description of the detected pattern of behavior, and optionally may include a time and location of the event, identification information (and possibly photographs) of any parties involved (where available), the image feed or a portion thereof (which could be a single still image frame), and/or other information that may be useful for the transit authority 112.

As another example, if fare evasion behavior is detected, the instructions may force the neural computing system 102 to send a notification to the user that has committed the form of fare evasion. The notification may inform the user that fare evasion behavior was detected and allows the user to correct this behavior, for instance, where the fare evasion behavior was accidental. For example, a user of the system may mistakenly think they have validated their fare media and instead may tailgate or piggyback off another user. If the user's identity is known (such as by using facial detection, other biometric identification, determining the identify by a transit stem beacon communicating with a transit application on the user device 110 and receiving an identifier of the user device 110 and/or the user, and/or other identification techniques) the neural computing system 102 may then send a notification to the user's personal mobile device 110 informing them that if they do not return and validate their fare media, transit authority 110 will be notified. The neural computing system 102 may be trained to determine whether the user continues on or whether the user returns to a validation device to validate the fare media. Based on this determination, the neural computing system may alert an authority or let the user continue on uninterrupted if they did, in fact, return to validate the fare media.

As another example, the neural computing system 102 may detect an emergency pattern of behavior. In such cases the instructions may cause the neural computing system 102 to send a notification of the emergency device(s) 114. This may involve sending the notification to a portable device carried by emergency personnel (law enforcement, security personnel, paramedics or other first responders, firefighting personnel, etc.), a computer operated by an emergency agency, and/or other device of an emergency agency. The notification may include a description of the detected pattern of behavior, and optionally may include a time and location of the event, ident cation information (and possibly photographs) of any parties involved (where available), the image feed or a portion thereof (which could be a single still image frame), and/or other information that may be useful for the emergency personnel.

In some embodiments, the neural computing system 102 may be in communication with one or more signs 124 and/or other public messaging systems. These may be used, for example, the inform customers of changes to routes, arrival/designation times, and/or other information. For example, if the neural computing system 102 determines that additional vehicles should be put into service, upon putting the vehicles into service the neural computing system 102 may change signage at the transit station to alert the users of the service change. In some embodiments, the neural computing system 102 may control a public address system and cause an automated message to be played that alerts the users of any changes. Signage 124 and other alerting systems may be modified to have other effects on users, such as where the neural computing system 102 has identified particular signage (or other information) as causing a particular pattern of behavior. The information may be altered in a manner that is likely to change/eliminate the detected behavior.

The neural computing system 102 may also be configured to collect information from a number of external data sources and sensors. This information may be analyzed by the neural computing system 102 and may be used to detect similarities in sets of circumstances (data from the external sources and/or sensors), which may be used to determine causes of the patterns of behavior and/or predict patterns of behavior prior to their occurrence. In some embodiments, after determining a cause of a particular pattern of behavior, the neural computing system 102 may determine (or be programmed with) a preventative action that may be performed that will prevent or reduce the likelihood of a particular pattern of behavior occurring.

One example of an external data source is a non-transit event system 116. For example, a concert venue, sports arena, convention center, and/or other event center may provide details to the neural computing system 102 about events they are hosting. For example, information about a number of people expected to attend, who actually attended a particular event, a location of the event (which may include a distance from one or more transit stations/stops), a start time/date of each event, an expected end time of each event, an actual end time of a particular event, a type of event, and/or other information that relates to a particular event. The neural computing system 102 may analyze this data in relation to a number of known patterns of behavior to identify any consistencies between them. For example, an analysis of the known patterns of behavior in conjunction with event data for events that occur within a predetermined threshold (1 minute, 5 minutes, 30 minutes, 1 hour, etc.) of each instance of a known pattern of behavior may reveal that for large events within 5 miles of a transit station, the transit station may be overcrowded for a certain period of time (such as 30 minutes or an hour) before and/or after the event. Thus, the neural computing system 102 may make the determination that for large, nearby events, transit ridership is increased and may associate the overcrowding in certain instances to be caused by the event. By identifying a cause, the neural computing system 102 may identify a possible preventative action. In the present case of overcrowding, the neural computing system 102 may instruct and/or otherwise cause the transit system to use larger capacity vehicles and/or schedule additional vehicles when a set of circumstances matching those identified as a possible cause of the overcrowding are detected. For example, the neural computing system 102 may compare upcoming (or currently occurring/recently ended) events to past events of similar types, sizes, start/end times, and the like. Upon finding similar past events, the neural computing system 102 may determine that the similar past events caused overcrowding. The neural computing system 102 may then instruct the transit system (via notifications and/or commands that instruct autonomous vehicles) to prepare to accommodate the larger number of passengers that are expected. Such efforts may eliminate and/or reduce any overcrowding experienced at a particular transit station.

In yet another example, the neural computing system 102 may receive additional data from the imaging sensors 104. For example, the imaging sensors 104 may count (or provide video feeds that allow the neural computing system 102 to count) users at a transit station, in queue for a particular vehicle, in queue at a validation and/or access device (such as gate 108, in queue at a particular ticket kiosk and/or other counts. This information may be used by the neural computing system 102 to not only identify certain patterns of behavior (such as overcrowding and/or excessive queueing), but may also be used as additional information for determining the cause of certain patterns of behavior. For example, when transit systems and/or devices are overcrowded and/or have too long of lines users may be tempted to try to skip transit access devices and/or tailgate due to the users being in a hurry and/or thinking that the presence of so many people may disguise the behavior. Corrective actions may involve those that reduce excessive queuing or overcrowding, such as sending commands or instructions to use larger capacity vehicles 106, more vehicles 106, and/or activating more access devices 108 and/or ticketing kiosks 118.

Additional sources of information that may be connected to the neural computing system 102 include computer systems of the transit vehicles 106 themselves. For example, the vehicles 106 may provide information related to their current destinations, origins, routes, estimated arrival times, actual arrival times, maximum available capacity, actual capacity, and/or other information. For example, the actual capacity may be determined based on validation information and/or video surveillance on the vehicle 106 and/or at a boarding/disembarking point(s) of the vehicle 106. The estimated arrival times may be based on transit timetables, beacon data, and/or GPS or other location data of each vehicle 106. This information may be useful to a neural computing system 102, as the system 102 may notice that when one or more vehicles 106 are running behind schedule, overcrowding in the station may occur.

The neural computing system 102 may also receive data from one or more access devices 106 (such as gates, turnstiles, and/or other validation devices). Such data may include information related to whether each user has successfully validated an access credential, such as a fare media. The data may also include information related to how many users have validated at each validation device (this may include real-time validation results). The neural computing system 102 may use such information to identify fare evasion behavior when a user who has not validated an access credential passes beyond the validation devices. Additionally, if the neural computing system 102 detects multiple users passing a validation device while only one validation result is received, the neural computing device 102 may determine that the second user is tailgating the first user. Additionally, rates of validations may be monitored to determine how busy the transit station is at a particular time. This information may be compared to the status of each validation device (whether it is activated or operational). If the neural computing system 102 has determined that a pattern behavior in an image feed matches excess queuing at access devices 106, the neural computing system 102 may check to see there are any validation devices that are in a nonoperational (out of service or otherwise non-functioning) state. If so, the neural computing system 102 may determine (perhaps based on instructions associated with its corresponding data tag) to send a command to at least one of the nonoperational validation devices that causes the validation devices to activate in an attempt to alleviate the excessive queuing. The number and location of the activated validation devices 106 may be based on a rate of validation and/or continued monitoring of the validation rate and queuing levels. In some embodiments, if the neural computing system 102 determines that the validation rate is low, the neural computing system 102 may send a command to one or more operational validation devices 106 that deactivate the validation devices 106. Such functionality helps increase the lifespan of the validation devices 106, as only those validation devices 106 that are necessary to maintain a desired queuing level and/or validation rate, thereby decreasing the in-service time of validation devices 106 that are not needed at a particular time.

In some embodiments, the neural computing system 102 may receive information from one or more fare media kiosks/vending machines 118. This information may include how many of the devices 118 are currently in use, how many fare media have been issued/topped-up/otherwise activated within a certain timeframe, a usage rate of each device 118, etc. If the neural computing system 102 identifies a pattern of behavior matching excessive queuing at such devices 118, the neural computing system 102 may determine whether there are any nonoperational kiosks 118 that may be activated. If so, the neural computing system 102 may send a command that causes one or more nonoperational kiosks 118 to be activated into an in-service condition. Similarly, if the usage rate of the machines is sufficiently low, the neural computing system 102 may issue a command to one or more of the kiosks 118 that causes the kiosk(s) to deactivate, thereby increasing the service life of the kiosk(s) 118.

The neural computing system 102 may also be configured to receive information from a timetable information source 120. For example, the neural computing system 102 may receive transit timetables for each of the transit vehicles within a transit system. This information may be analyzed upon detecting a known pattern of behavior to determine whether the transit schedule has an effect on any of the patterns of behavior. For example, if the neural computing system 102 notices that upon a certain point in the timetable (or for a particular scheduled route/vehicle) there is an overcrowding issue, the neural computing system 102 may determine that additional vehicles need to be added, larger capacity vehicles need to be used, the timetables need to be adjusted to space out departure and/or arrival times of popular vehicles, and/or other action that may be identified from the timetable data and be determined to have an effect on the crowds on the transit station. The neural computing system 102 may then perform the required action.

In some embodiments, the neural computing system 102 may receive data from a biometric data source 122. This information may include identity information of identified users, demographic information of users (especially in the case of facial recognition), information about the demeanor of users (which may be used by the neural computing system 102 to detect and/or predict future behavior patterns), validation results (in embodiments where biometric authentication is used as an access credential), and/or other information. This information may be used by the neural computing system 102 to identify the causes of certain patterns of behavior. For example, the neural computing system 102 may detect that a particular user has been previously involved in one or more out-of-the-norm patterns of behavior one or more times. Depending on the identified pattern of behavior, the neural computing system 102 may identify a response to prevent this user from repeating his earlier behavior. For example, if the user has practiced fare evasion in the past, the neural computing system 102 may alert the nearest fare inspector or other transit personnel to carefully watch the particular user as he navigates the validation area of the transit station. In some embodiments, the neural computing system 102 may utilize the information from the biometric data source 122 to populate information in the various notifications it sends. For example, user devices 110 may be identified based on known user identities and/or validation results at biometric validation devices. In embodiments where a notification is being sent to a transit authority, emergency personnel, etc. Facial recognition systems may capture an image of the user's face, which may be retrieved and appended to the notifications.

Other sources that may impact the operation of a transit system may be utilized. For example, a clock may be used to correlate patterns of behavior with different times of day. For example, the neural computing system 102 may detect that certain patterns of behavior occur only at a certain time or are more likely to occur at a certain time. The neural computing system 102 may alert the necessary authorities of this information and/or identify a preventative action that may be performed and put it into action to reduce the likelihood of the identified pattern of behavior. Similarly, weather data may be received and correlated with certain patterns of behavior.

It will be appreciated that numerous other sources of information may be connected to the neural computing system 102, which may use such data to identify patterns of behavior, identify causes of patterns of behavior, identify preventative actions, generate notifications, and/or perform other actions related to the patterns of behavior. Moreover, while discussed herein individually, it will be appreciated that any combination of one or more types of data from any combination of the sources described herein may be analyzed together or alone to detect a set of circumstances that may give rise to the pattern of behavior, identify causes of patterns of behavior, identify preventative actions, generate notifications, and/or perform another actions related to the patterns of behavior. The neural computing system 102 may determine any correlations/causes, etc. based on a single instance of detection/correlation and/or patterns found in multiple instances over a history of detection.

In some instances, the neural computing system 102 may detect an out-of-the-norm pattern of behavior, but not be able to classify it as a known pattern of behavior. This may be due to the identified behavior being just different enough that an error rate of the identification step is too high to make a positive conclusion and/or because the detected pattern of behavior is new and has not been previously detected or tagged. In such embodiments, the neural computing system 102 may send the image feed (or portion thereof) that contains the new/unidentified pattern of behavior to a human analyst. The analyst may review the image feed and determine what type of behavior is depicted. The analyst may then tag the image and/or instruct the neural computing system 102 to perform a particular action (such as send commands to one or more remote devices) based on detecting such behavior in the future.

In some embodiments, a human analyst may review image feeds for some or all of the patterns of behavior that are identified by the neural computing system 102. The human analyst may determine whether the neural computing system 102 correctly identified each pattern of behavior and/or whether the proper action(s) (notifications, cause identification, preventative action, etc.) were performed. If not, the analyst may tag the incorrectly handled image feed with the proper tag to further teach the neural computing system 102, thereby allowing the neural computing system 102 to constantly improve its error rate.

It will be appreciated that the examples of detected patterns of behavior, external data sources, determinations of causes, preventative actions, notifications, and/or other information described above only represent a small subset of the possible outcomes of the neural computing system 102. Any combination of the above features may be used in conjunction with one another as is useful for a particular application.

Figure 2:
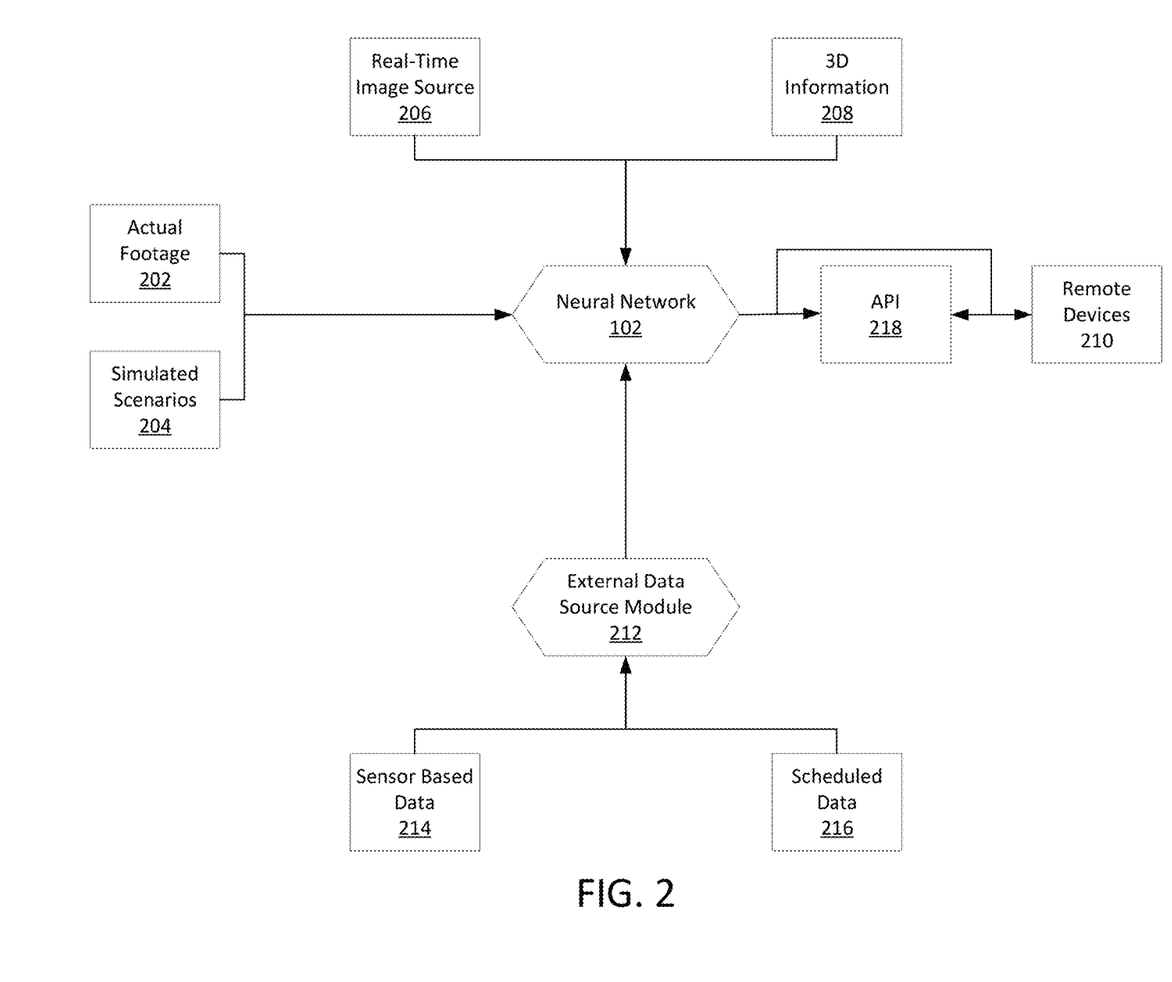
FIG. 2 depicts a general process flow for the incidence avoidance system of FIG. 1 according to embodiments.

FIG. 2 depicts a general process flow for the neural computing system 102. For example, the neural computing system 102 may receive image feeds that include captured scenarios of patterns of behavior from actual footage 202 and from simulated scenarios 204. These image feeds include some sort of user input from a human analyst that includes a scenario categorization, such as through data tagging. The neural computing system 102 analyzing a large number of these image feeds and their associated data tags to learn what a particular pattern of behavior looks like. Once trained, the neural computing system 102 may be fed with one or more image feeds to monitor from a real-time image source 206 (such as cameras, IR sensors, LIDAR, etc.), and in some embodiments will receive 3-dimensional information 208 related to an environment being monitored by the real-time image source 206. This allows the neural computing system 102 to get an idea of the environment it is monitoring for out-of-the-norm scenarios/patterns of behavior.

The neural computing system 102 may analyze the video feeds and identify whether they depict any known patterns of behavior based on whether they closely match behaviors shown in the actual footage 202 and/or the simulated scenarios 204 (or earlier recorded images from the real-time image source 206 that have been analyzed and tagged by a human analyst). If a known pattern of behavior is detected, the neural computing system 102 data, including notifications and/or commands to various remote devices 210 (mobile devices, portable fare devices, emergency personnel devices, vehicles, access/validation devices, kiosks, etc.) may be pushed to an API 218 that allows the various remote devices 210 to have access (either from information/commands being pushed to them or from the devices requesting the information via the API 218) to the information associated with a known pattern of behavior. If an unknown pattern of behavior is detected, the neural computing system 102 may send a notification to a human analyst of such a result, which may include the video feed containing the unknown behavior. The human analyst may then review the feed and tag the image feed with information associated with a pattern of behavior exhibited within the feed. this information is sent back to the neural computing system 102, which uses it to learn new patterns of behavior for future detection.

In some embodiments, the neural computing system 102 may be in communication (over one or more wired and/or wireless networks, which may be public and/or private and may be secured, such as by providing an encrypted communication channel between the various systems) with one or more external data source modules 212. The external data source module(s) 212 provide the neural computing system 102 with additional information, such as sensor-based data 214 (from signage, imaging sensors, vehicle, validation devices, kiosks, weather sensors, IR sensors, biometric sensors, and the like, such as those described in relation to FIG. 1) and/or scheduled and/or anticipated data 216 (such as event data, transit timetables, actual arrival/departure times, purchased fare information, disruption data, and the like, such as that described in relation to FIG. 1). The data from the external data source modules 212 may be used to help verify/detect patterns of behavior from the real-time image source 206 as well as to provide context for such behavior. For example, the neural computing system 102 may analyzes this external data in conjunction with the detected patterns of behavior to identify possible causes of certain behavior based on sets of circumstances found in the external data that are common in similar behavior types.

Once a cause is known, certain actions may be taken, including notifying authorities when the set of circumstances is occurring (or may be about to occur, such as when all but one or two common features associated with a particular scenario are currently detected) to alert the authorities to take preventative action. In some embodiments, the neural computing system 102 may itself take preventative action, such as by commanding a remote device to function in a certain way (turn on/off, for example).

Figure 3:
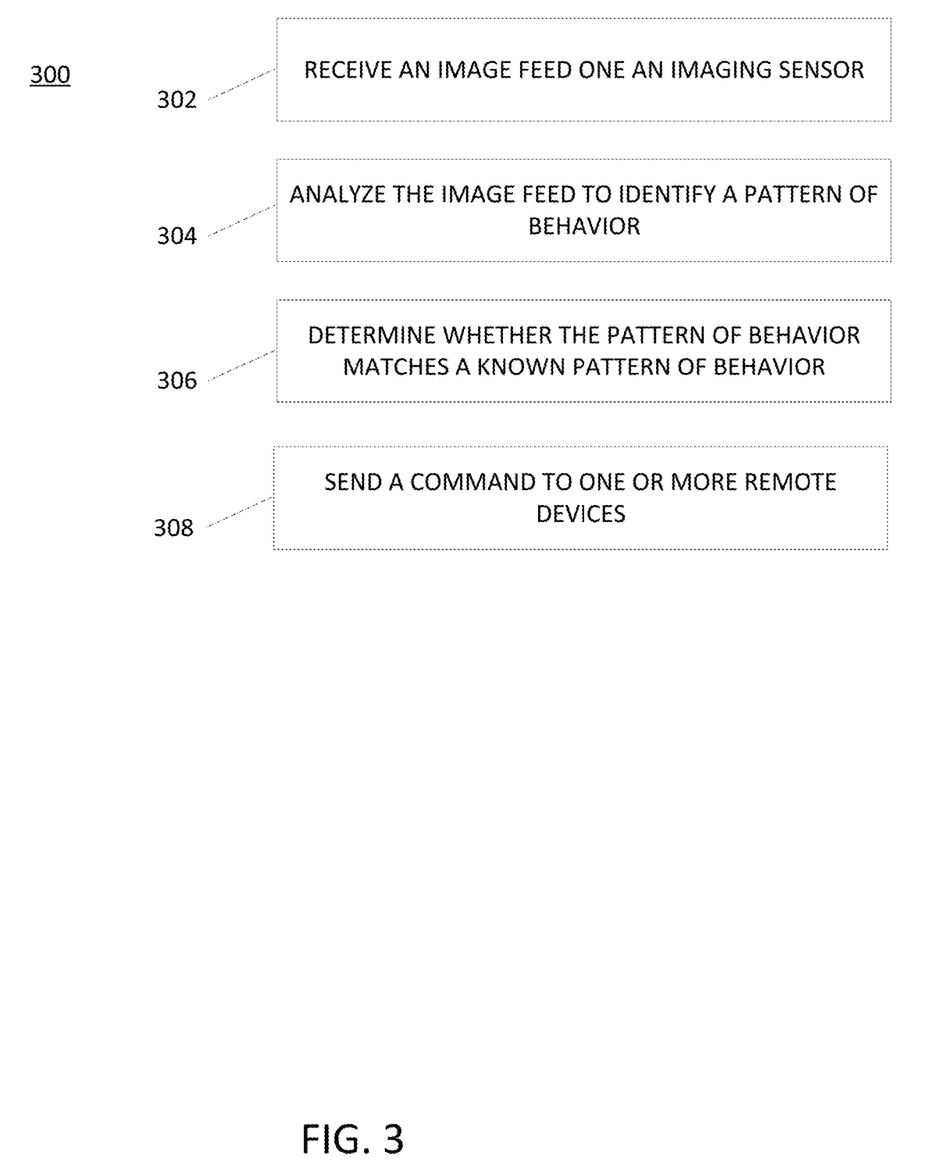
FIG. 3 depicts a flowchart of a process for detecting and avoiding incidents according to embodiments.

FIG. 3 is a flowchart of a process 300 for detecting and avoiding incidents. Process 300 may be performed by a neural network, such as neural computing system 102. In some embodiments, the neural network must be trained to detect out-of-the-norm patterns of behavior. This may include analyzing a number of image feeds that may depict known patterns of behavior. These patterns of behavior may all be out-of-the-norm behaviors and/or may include some normal behavior (allowing the neural network to later detect out-of-the-norm behaviors that it was not specifically trained to detect by determining that the behaviors do not match any of the known out-of-the-norm patterns of behavior or any known normal patterns of behavior). The neural network may receive information related to a plurality of patterns of behavior. The information may be supplied by a human analyst who has tagged each image feed with a pattern of behavior. In some embodiments, the tag may include or be associated with a characterization of at least one known pattern of behavior present in each of the plurality of image feeds. The information may also include an instruction on what the neural network should do upon detecting such behavior in the future (sending notifications/commands to remote devices, etc.). this information may be stored by the neural network. Once the neural network has been taught, the process 300 begins by receiving an image feed from at least one imaging sensor at block 302. The imaging sensor may be any of the image sensors described in relation to FIG. 1, including cameras, LIDAR sensors, IR sensors, and the like. At block 304, the image feed is analyzed to identify a pattern of behavior exhibited by subjects within the image feed. The neural network may determine whether the identified pattern of behavior matches a known pattern of behavior at block 306. This may be done by comparing the image feed (and/or data extracted from the image feed) to data associated with the known patterns of behavior (or in some embodiments based on additional information, such as sensor data or scheduled/derived data as described above).

For example, if no match is found, the neural network may communicate the image feed to a human analyst device for manual review. The analyst may then review and tag the feed with information that includes an instruction that informs the neural network of the type of behavior in the video feed and instructs the neural network on what action to take upon future detections. This may include what content should be included in subsequent commands associated with the identified pattern of behavior, such as notifications to authorities, commands to manipulate devices, and the like. The instruction may include a list of one or more specific devices to notify/control upon the subsequent detection of this pattern of behavior, allowing the neural network to adapt to learn to detect and handle new patterns of behavior at all times. Upon subsequent detection of the new patterns of behavior, the neural network may perform the tasks provided by the human analyst.

If a match to the initially detected behavior is found, the neural network may perform an action associated with the known pattern of behavior (which may be do nothing if the detected pattern of behavior is normal behavior). For example, at block 308, a command may be sent to one or more remote devices. The command may be a notification that causes an audio and/or visual alert to be produced by a particular device. In other embodiments, the command may be an electronic instruction that causes a remote device to perform a physical function (such as turn on/off, changing wording on signage, initiating an automated PA announcement, activate additional vehicles, etc.). The command may be directed to one or more particular devices. The type of command and recipient remote device(s) are based on whether the identified pattern of behavior matches a known pattern of behavior and/or the type of pattern of behavior that is detected. For example, if an emergency situation is detected, the command may include a notification that details the emergency situation (time, place, parties involved, type of emergency, etc.) to an emergency authority and/or transit authority. If excessive queueing is detecting, the command may include instructions to activate an additional validation device. These are merely examples, and numerous combinations of command content and remote device combinations may be used in a particular application based on the detected pattern of behavior. Various commands may include, but are not limited to activating additional transit vehicles to handle overflow, deactivating unnecessary vehicles, alerting passengers of new/canceled vehicles, disruptions, and/or other changes via signing changes, automated PA announcements, direct notifications to personal user devices, etc. Commands may also include general notifications, instructions to activate/deactivate transit equipment, open/close/lock/unlock gates or other barriers, and/or other commands that cause various remote devices to perform functions.

In some embodiments, process 300 involves determining a cause of a particular pattern of behavior. For example, several instances of a particular patterns of behavior from additional image feeds may be analyze din conjunction with sensor data and/or scheduled/derived data received from one or more sensors of a transit system or other external sources. This external data may include data that is related to a timeframe within a predetermined threshold before and/or during a particular pattern of behavior. Based on the analysis, the neural network may identify a common set of circumstances between at least one of the plurality of patterns of behavior and at least some of the sensor data and/or other external data. Based on this, a subsequent occurrence of the at least one of the plurality of patterns of behavior may be predicted by identifying the occurrence of all or a significant portion of the set of circumstances.

In some embodiments, once a cause is known and an occurrence can be predicted, a preventative action may be identified. For example, the neural network may determine that after baseball games, a particular transit stop near the stadium experiences excessive queueing at validation devices and/or fare dispensing kiosks. Based on this data, upon detecting the end of a baseball game (either based on a real end time or an expected end time) the neural network may activate additional kiosk and/or validation devices at or near the end of the game in anticipation of the increased volume of users to help reduce the queue lengths.

Figure 4:
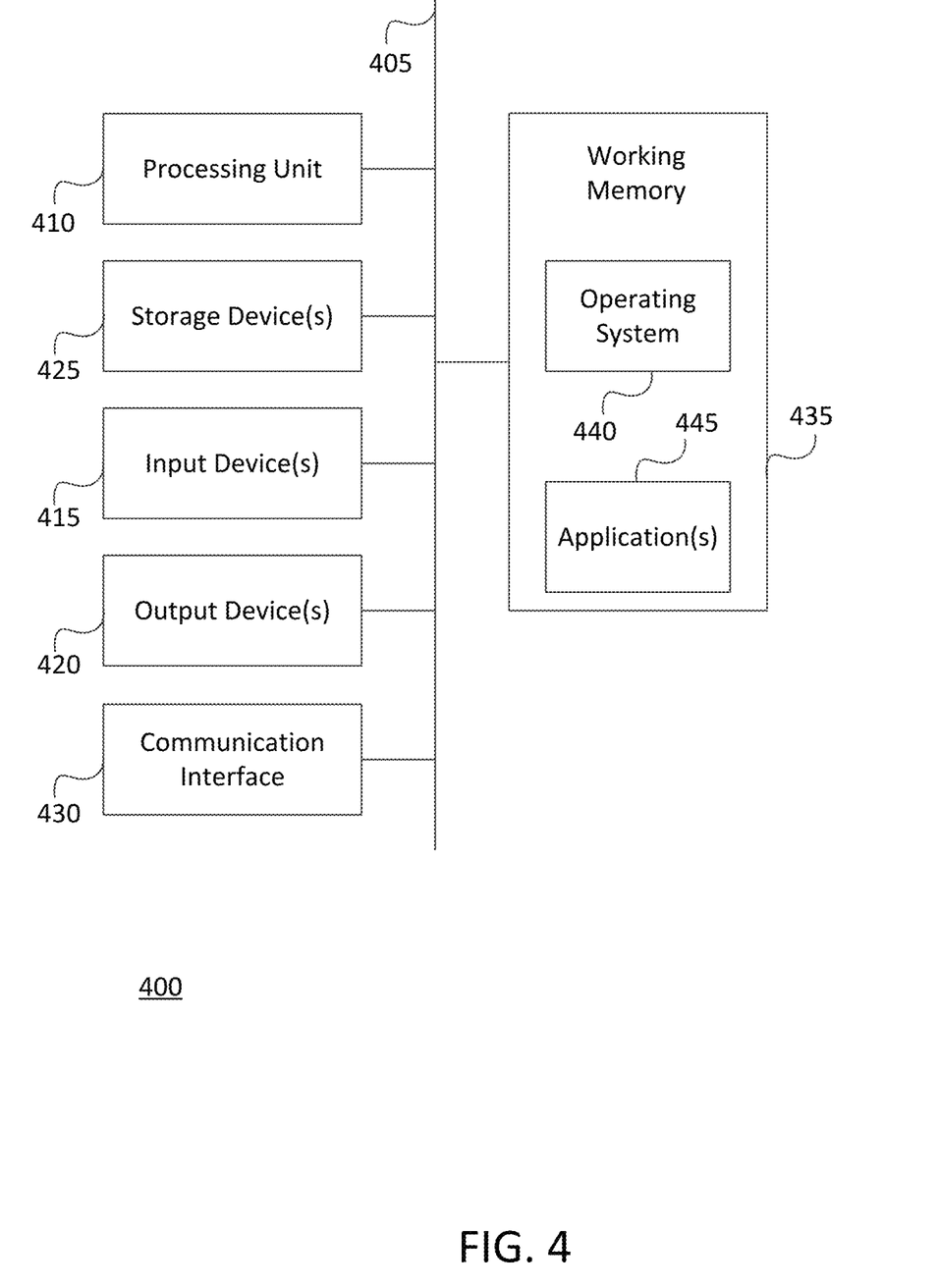
FIG. 4 is a schematic of a computer system according to embodiments.

A computer system as illustrated in FIG. 4 may be incorporated as part of the previously described computerized devices. For example, computer system 400 can represent some of the components of the neural computing system 102, and the like described herein. FIG. 4 provides a schematic illustration of one embodiment of a computer system 400 that can perform the methods provided by various other embodiments, as described herein. FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements may include a processing unit 410, including without limitation one or more processors, such as one or more special-purpose processors (such as digital signal processing chips, graphics acceleration processors, and/or the like); one or more input devices 415, which can include without limitation a keyboard, a touchscreen, receiver, a motion sensor, a camera, a smartcard reader, a contactless media reader, and/or the like; and one or more output devices 420, which can include without limitation a display device, a speaker, a printer, a writing module, and/or the like.

The computer system 400 may further include (and/or be in communication with) one or more non-transitory storage devices 425, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 400 might also include a communication interface 430, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 430 may permit data to be exchanged with a network (such as the network described below, to name one example), other computer systems, and/or any other devices described herein. In many embodiments, the computer system 400 will further comprise a non-transitory working memory 435, which can include a RAM or ROM device, as described above.

The computer system 400 also can comprise software elements, shown as being currently located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 425 described above. In some cases, the storage medium might be incorporated within a computer system, such as computer system 400. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 410, applications 445, etc.) Further, connection to other computing devices such as network input/output devices may be employed.

Some embodiments may employ a computer system (such as the computer system 400) to perform methods in accordance with the disclosure. For example, some or all of the procedures of the described methods may be performed by the computer system 400 in response to processing unit 410 executing one or more sequences of one or more instructions (which might be incorporated into the operating system 440 and/or other code, such as an application program 445) contained in the working memory 435. Such instructions may be read into the working memory 435 from another computer-readable medium, such as one or more of the storage device(s) 425. Merely by way of example, execution of the sequences of instructions contained in the working memory 435 might cause the processing unit 410 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 400, various computer-readable media might be involved in providing instructions/code to processing unit 410 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 425. Volatile media include, without limitation, dynamic memory, such as the working memory 435. Transmission media include, without limitation, coaxial cables, copper wire, and fiber optics, including the wires that comprise the bus 405, as well as the various components of the communication interface 430 (and/or the media by which the communication interface 430 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 430 (and/or components thereof) generally will receive the signals, and the bus 405 then might carry the signals (and/or the data, instructions, etc. carried by the signals) to the working memory 435, from which the processor(s) 405 retrieves and executes the instructions. The instructions received by the working memory 435 may optionally be stored on a non-transitory storage device 425 either before or after execution by the processing unit 410.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

The methods, systems, devices, graphs, and tables discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein. As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. An incident avoidance system, comprising:
   a plurality of imaging sensors; and
   a neural computing system configured to:
   detect several instances of a particular pattern of behavior over a history of detection of the neural computing system;
   identify a particular set of circumstances that has been commonly associated with the several instances of the particular pattern of behavior over the history of detection of the neural computing system;
   identify a cause of the particular pattern of behavior based at least on the particular set of circumstances;
   determine a preventative action based on the particular set of circumstances and the identified cause;
   associate the preventative action with the particular pattern of behavior, wherein the particular pattern of behavior is classified as a known pattern of behavior;
   receive, after determining the preventative action, an image feed from at least one of the plurality of imaging sensors;
   analyze the image feed to identify a pattern of behavior exhibited by subjects within the image feed;
   determine that the identified pattern of behavior matches the known pattern of behavior; and
   perform the preventative action when the particular set of circumstances is detected a subsequent time, wherein performing the preventative action comprises sending a command to one or more remote devices, wherein one or both of a type of the command or the one or more remote devices are selected based on a result of the determination that the identified pattern of behavior matches the known pattern of behavior, and wherein at least one of the one or more remote devices comprises a transit system device.

2. The incident avoidance system of claim 1, wherein:
   identifying the cause comprises receiving data from one or more external sources;
   the received data is associated with a time that is within a threshold range of the identified pattern of behavior; and
   the cause is further identified based at least in part on at least a portion of the received data.

3. The incident avoidance system of claim 2, wherein:
   the received data comprises one or more elements selected from the following: a time of day, weather data, timetable data, non-transit event data, or transit system device data.

4. The incident avoidance system of claim 1, wherein:
   one or both of a type of the command or the one or more remote devices are selected further based on the identified cause.

5. The incident avoidance system of claim 1, wherein the neural computing system is further configured to:
   at a later time, identify a set of circumstances matching the identified cause; and
   send a command that implements the preventative action.

6. A method of detecting and avoiding incidents, comprising:
   detecting several instances of a particular pattern of behavior over a history of detection of a neural computing system;
   identifying a particular set of circumstances that has been commonly associated with the several instances of the particular pattern of behavior over the history of detection of the neural computing system;
   identifying a cause of the particular pattern of behavior based at least on the particular set of circumstances;
   determining a preventative action based on the particular set of circumstances and the identified cause;

associating the preventative action with the particular pattern of behavior, wherein the particular pattern of behavior is classified as a known pattern of behavior;

receiving after determining the preventative action, at a neural computing system, an image feed from at least one imaging sensor;

analyzing the image feed to identify a pattern of behavior exhibited by subjects within the image feed;

determining that the identified pattern of behavior matches the known pattern of behavior; and performing the preventative action when the particular set of circumstances is detected a subsequent time, wherein performing the preventative action comprises sending a command to one or more remote devices, wherein one or both of a type of the command or the one or more remote devices are selected based on a result of the determination that the identified pattern of behavior matches the known pattern of behavior, and wherein at least one of the one or more remote devices comprises a transit system device.

7. The method of detecting and avoiding incidents of claim 6, further comprising:

identifying an additional plurality of patterns of behavior from additional image feeds;

receiving sensor data from one or more sensors of a transit system;

analyzing the additional plurality of patterns of behavior and the sensor data to identify a common set of circumstances between at least one of the plurality of patterns of behavior and at least a portion of the sensor data; and predicting a subsequent occurrence of the at least one of the plurality of patterns of behavior.

8. The method of detecting and avoiding incidents of claim 6, further comprising:

determining that the identified pattern of behavior involves an emergency scenario, wherein the command comprises an alert detailing a type of the emergency scenario, and wherein the one or more remote devices comprises an emergency agency system.

9. The method of detecting and avoiding incidents of claim 6, further comprising:

prior to receiving the image feed, analyzing a plurality of image feeds;

receiving information related to a plurality of patterns of behavior, wherein each of the plurality of patterns of behavior is associated with at least one of the plurality of image feeds, wherein the information comprises a characterization of at least one known pattern of behavior present in each of the plurality of image feeds; and storing each of the plurality of known patterns of behavior.

10. The method of detecting and avoiding incidents of claim 6, wherein:

the at least one imaging sensor comprises a LIDAR device.

* * * * *